(12) United States Patent
Fox, Jr.

(10) Patent No.: US 7,264,205 B2
(45) Date of Patent: Sep. 4, 2007

(54) PARACHUTE RELEASE APPARATUS

(76) Inventor: Roy L Fox, Jr., Route 1 Box 32 A, Belleville, WV (US) 26133

( * ) Notice: Subject to any disclaimer, the term of this patent is extended or adjusted under 35 U.S.C. 154(b) by 153 days.

(21) Appl. No.: 11/232,730

(22) Filed: Sep. 22, 2005

(65) Prior Publication Data

US 2007/0063103 A1    Mar. 22, 2007

(51) Int. Cl.
*B64D 17/38* (2006.01)
(52) U.S. Cl. .................................. 244/151 B
(58) Field of Classification Search ........... 244/151 B, 244/148, 149, 150, 138 R; 24/637, 645
See application file for complete search history.

(56) References Cited

U.S. PATENT DOCUMENTS

| | | | |
|---|---|---|---|
| 2,534,866 A * | 12/1950 | Hakomaki | 74/3.56 |
| 2,834,083 A | 5/1958 | Newell et al. | |
| 2,924,408 A * | 2/1960 | Yost | 244/137.4 |
| 3,122,392 A | 2/1964 | Benditt et al. | |
| 3,466,081 A | 9/1969 | Femia | |
| 4,030,689 A | 6/1977 | Rodriguez | |
| 4,337,913 A | 7/1982 | Booth | |
| 4,339,098 A | 7/1982 | Tardot et al. | |
| 4,493,240 A | 1/1985 | Norton | |
| 4,592,524 A | 6/1986 | Nohren et al. | |
| 4,765,571 A | 8/1988 | Barbe | |
| 5,618,011 A | 4/1997 | Sadeck et al. | |
| 5,887,825 A | 3/1999 | Noel | |
| 6,249,937 B1 | 6/2001 | Grenga | |
| 6,644,597 B1 | 11/2003 | Bahniuk | |

* cited by examiner

Primary Examiner—Tien Dinh
(74) Attorney, Agent, or Firm—John J. Giblin; Bowles Rice McDavid Graff & Love LLP

(57) ABSTRACT

A parachute release apparatus for controllably and timely releasing a drogue parachute from a descending, aerially delivered cargo platform. The parachute release apparatus is comprised of a pendant body with multiple parallel plates. Cavities are defined between each two parallel plates of the pendant body. Latch mechanisms are disposed on either side of the pendant body. Each latch mechanism is comprised of an articulating outer and inner plate. Within each cavity is a pair of release arms which articulate with the pendant body. Either release arm engages with the inner latch plate of each latch mechanism. The latch mechanisms are maintained in a latched configuration by a cut loop attached to extension arms on either outer latch plate, and are released by a pyrotechnic cutter disposed on the cut loop. A plurality of suspension straps are coupled with the apparatus, which are enshrouded in a bifurcated sleeve.

14 Claims, 8 Drawing Sheets

PARACHUTE RELEASE APPARATUS

BACKGROUND OF THE INVENTION

1. Field of the Invention

The present invention relates to parachute release mechanisms for releasing a deployed parachute from a suspended load in a controlled manner.

2. Description of the Prior Art

Aerial delivery is a means frequently used for transporting cargo quickly to areas of limited or hostile access, without the availability of any nearby airports. At times, people in isolated areas, such as jungles, deserts, mountains, polar regions, or combat zones, are in need of essential supplies, including food and medical supplies, but are not within access to an airport at which a supply plane could land. In these instances, aerial delivery of cargo from in-flight aircraft is the sole option. These aerial delivery systems involve the use of parachute systems to slow the descent and gently land the cargo platforms on the ground.

Similar parachute systems are further utilized for recovery of aeronautical and astronautical vehicles, including rocket boosters, experimental aircraft and space capsules, returning back to the earth's surface from flights in the upper atmosphere or outer space.

In these aerial delivery or recovery systems, a series of parachute deployments is often used to progressively slow the decent velocity of the payload. Use of a series of parachute deployments is often necessary because the force and impulse on the suspension lines and straps of a main parachute (i.e., one large enough to slow the cargo platform to an acceptable landing velocity) deploying at the terminal, free-fall velocity of the cargo platform would be excessive, causing the parachute system to fail. Instead, the cargo platform is typically slowed in a series of stages using subsequently larger parachutes.

A drogue parachute is typically deployed first from the parachute system. The drogue is a small parachute which can be easily deployed from its container by a tether attached to the launching cargo plane or by an easily deployed stored energy means such as a spring launched pilot parachute. As the drogue parachute is deployed and inflated, it moderately decelerates the suspended cargo platform, without excessive strain on the slings and parachute canopy from which the cargo platform is suspended. After a pre-determined time period, the drogue parachute is released from the suspended cargo platform. The drag provided by the released drogue parachute is then utilized to pull and deploy the next, larger parachute. This next parachute may be the final, main parachute, or another intermediary parachute prior to another subsequent deployment of the main parachute, depending upon the size of the cargo platform and the design of the parachute system.

To accomplish this release design, the drogue parachute is attached to the suspended cargo platform by a release mechanism. The suspended cargo platform is suspended from the release mechanism typically by a series of suspension slings. The suspension slings maintain the suspended cargo platform in a stable, level attitude. The number of suspension slings is typically four, with one routed to each corner of a square or rectangular cargo platform supporting the suspended cargo. For larger platforms, a greater number of suspension slings may be used. The suspension slings converge at a point above the suspended load to the release mechanism, located at the apex of the pyramid formed by the suspension slings.

The release mechanism must release all attached suspension slings simultaneously, otherwise the suspended cargo platform will pitch or roll after release, jeopardizing successful deployment of the next parachute. Various means are available in the art for simultaneously releasing the suspension slings.

One such mechanism is a pyrotechnic cord cutter powered by an explosive or pyrotechnic charge. This mechanism utilizes the detonation of a small explosive charge to drive a cutting blade through the suspension sling. For example, Norton, U.S. Pat. No. 4,493,240, disclosed a pyrotechnic cord cutter comprising an elongated cylindrical body with a lateral aperture proximate to one end of the body, through which passes the suspension line or other support line in the parachute system. A chamber is located at the other end of the body, containing an explosive charge. An opening is provided in the medial end of the chamber, into which is registered the rear end of a cutting blade. Upon detonation of the explosive charge in the chamber, the cutting blade is propelled through the aperture, severing the cord within.

The release mechanisms may be configured in either a single-point or multi-point suspension release system. Either of these release systems involve a suspension system utilizing a number of suspension slings, typically four, in which the lower end of each suspension sling attaches to one corner of the load platform and the upper ends of all four suspension slings are joined by a union, forming a pyramid with an apex at the union, to which is attached the drogue parachute. In the single-point system, the release mechanism is located on a link or union at the pyramid apex which conjoins the upper ends of the suspension slings and which also conjoins with the suspension lines of the drogue parachute. Severing the link with a pyrotechnic cutter releases the upper ends of all four suspension slings simultaneously.

The single-point system is suitable for relatively light cargo platforms. As the size and weight of the suspended cargo platform increases, so to does the size and thickness of the link or union between the suspension slings and the drogue parachute suspension lines, and thus, so to does the size of the pyrotechnic charge necessary to sever the link. These larger pyrotechnic charges pose a substantial hazard to the personnel preparing the cargo delivery system and to the aircraft carrying the cargo platform to the delivery site. Larger platforms instead use a multi-point release system.

In the multi-point release system, a separate release mechanism is located on each suspension sling, typically at the lower end of each sling or on the hardware attaching the sling to the cargo platform. Thus, each pyrotechnic charge is one-fourth or smaller of the size necessary for a single-point system.

As previously noted, simultaneous release of the suspension slings is critical to assure the cargo load platform remains level during deployment of the main parachute. The single-point system only has one release mechanism which assures release of all suspension slings simultaneously. Having only one release mechanism, the single-point system is also less expensive and easier to control. However, one disadvantage is that the suspension slings, once released, remain with the cargo load platform, streaming in the air vertically above the platform, where they can potentially interfere with deployment of, and entangle with, the main parachute. Another disadvantage is that the single-point release mechanism must support the entire weight of the suspended cargo load platform, which requires a larger mechanism than those used in the multi-point systems and a larger, more hazardous, pyrotechnic charge, as previously noted.

The multi-point system, on the other hand, utilizes smaller release mechanisms, which, when based on a pyrotechnic charge, as is most commonly the case, are safer for personnel preparing and handling the parachute system. Also, upon release, the suspension slings remain with the drogue parachute rather than with the cargo load platform, eliminating the entanglement hazard of undulating suspension straps to the deploying main parachute. However, multiple release mechanisms are used, in which all the pyrotechnic charges must be detonated simultaneously for an even, controlled release of the suspended load. Almost any variation or delay in these detonations of the pyrotechnic charge could apply an asymmetrical torque to the suspended load, causing it to roll after release and interfere with subsequent deployment of the main parachute.

SUMMARY OF THE INVENTION

A drogue parachute release apparatus and system are provided for releasing heavier cargo platforms by a single-point release mode while using significantly smaller pyrotechnic charges typical of multi-point release systems.

A parachute release apparatus and system is provided for installation between an aerially descending cargo platform and its drogue parachute. The parachute release apparatus is disposed between the drogue parachute and the suspension straps leading to the platform or pallet supporting the delivery load. The parachute release apparatus has a pendant body with a connection means located at its upper portion for connection to the suspension lines or risers of a drogue parachute. The release apparatus has two or more pair of pivoting release arms. Each pair of release arms are situate within a separate cavity defined by the body and pivot about a common axle or pivot pin located medially in the body. Each release arm has a free end section which, when in a latched configuration, is aligned horizontally and opposed to each other, engaging with a latch apparatus on either side of the body.

In one embodiment, the latch mechanism is comprised of two articulating flat plates, the surfaces of which are parallel to and overlay each other and normal to the proximate release arm. The outer plate articulates about its lower end with the pendant body, while the inner plate articulates about its upper end. The inner plate has one or more sockets defined in its inner surface, each of which engages with the free end section of a proximate release arm. The release arm is engaged with the latch mechanism by positioning the release arm horizontally, then articulating the inner plate of the latch mechanism until the socket defined in the inner surface of the inner plate engages with the free end of the release arm. The outer arm, which articulates from its lower edge, articulates upward to engage its inner surface with the outer surface of the inner plate. The outer plate of the latch mechanism has an elongated extension which extends upward when the outer plate is in the latched position with the inner plate. The same design is repeated on the other side of the pendant body.

The two outer plates are secured against the inner plates by securing together the extensions of the two opposing outer plates. The two extensions are secured by a releasable link, such as a frangible cord, called a cut loop, wrapped around the two extensions. A means for severing the cut loop is attached thereto, typically a pyrotechnic cord cutter, which, upon an activation signal, severs the cut loop, releasing the binding on the two extensions. This allows the outer and then the inner plates to articulate outward, thereby releasing the free end sections of two release arms from the sockets, thereby permitting both release arms to articulate about the pivot axle.

In use, straps from the suspended load engage with the release arms, typically by loops in the end sections of the strap which slide over the release arms. When the free end sections disengage from the latch mechanism, the loops quickly and simultaneously slide off the release arms, releasing the cargo platform from the drogue parachute. Because of the leverage provided in the latch mechanism, the cut loop used to secure the latch mechanism is much thinner than that necessary in a typically single-point system which links the suspension slings directly to the drogue parachute suspension lines. This requires a much smaller pyrotechnic charge for a cord cutter to sever the cut loop, while still maintaining the advantage of simultaneous release of all the suspension straps of the cargo platform.

Because the weight of the cargo platform is supported by the pendant body rather than directly by the cut loop, the release apparatus is capable of supporting a large suspended load which can be released with only a very small pyrotechnic charge. The arrangement of the articulating latch plates leverages the restraining force of the cut loop to provide a substantially greater force supporting the release arms. The proportional weight of each suspension strap is supported by its applicable release arm, which in turn is supported by the pivot axle and the socket of the inner latch plate. The socket in the inner latch plate, as well as the free end section of the release arm, is adapted so that most of the force from the release arm is supported in the inner plate orthogonal to the axis of the release arm, while only a small fraction of the supported force is directed coaxial to the release arm, and normal to the plane of the inner latch plate. The outer latch plate maintains the inner plate in its secured position, and due to the force distribution in the inner latch plate, requires only a proportionally small force to maintain engagement between the socket of the inner latch plate and the free end of the release arm. This force is applied through the outer plate extension, which gains further leverage by its greater distance from the articulation axis of the outer plate than imposed by the outward force of the release arm applied near the center of the latch plates. Accordingly, the cut loop securing together the two outer plate extensions is significantly less substantial than the suspension straps securing the cargo platform to the release mechanism. This cut loop of the present invention may be severed with a much smaller, and much safer, pyrotechnic cord cutter than would otherwise be necessary to sever the much larger one directly supporting to the cargo platform. The present invention is an improvement over the multi-point release system, as well, as only one pyrotechnic charge must be detonated, eliminating the timing concerns of the multi-point system, and utilizing an even smaller pyrotechnic charge than even the multi-point system.

The suspension straps extend downward from the pendant body, and may couple with the cargo platform by one of two means. In the first means, one end of each suspension strap is secured by a loop to a release arm, and the other end secured to a corner of the cargo platform, as typical of conventional single-point release systems. To release the cargo platform from the drogue parachute, the release arms are released, which releases the ends of the suspension straps, the suspension straps remaining secured to and descending with the cargo platform.

In the second means, each suspension strap is secured by a loop to a release arm, as in the first means. However, the suspension strap traverses down and through a clevis, yoke, or the like on the cargo platform, forming a bight around the clevis, and then traverses back up again and is fixed to the release body. When the release arms are released from the inner latch plates, the first end of the suspension straps are released, and the first half of the suspension straps slide through the shackles on the cargo platform as the cargo platform descends away from the release mechanism. The suspension straps remain with the release mechanism, leaving the cargo platform unencumbered by undulating straps which may interfere with subsequent deployment of the main parachute from the cargo platform. The benefit of the multi-point release system of having the suspension straps remain with the drogue parachute is combined with that of a single release mechanism of the single-point release system.

In the second release means of the suspension straps, the two strap halves are enclosed within a sleeve which encloses the strap during the release process, preventing the straps from entangling with each other or with the cargo platform.

These and other advantages of the invention will become apparent from the description which follows. In the description, reference is made to the accompanying drawings, which form a part hereof, and in which is shown by way of illustration specific embodiments in which the invention may be protected. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

DETAILED DESCRIPTION OF THE PREFERRED EMBODIMENTS

The following discussion describes in detail one or more embodiments of the invention. The discussion should not be construed, however, as limiting the invention to those particular embodiments, and practitioners skilled in the art will recognize numerous other embodiments as well. The complete scope of the invention is defined in the claims appended hereto.

Within the appended figures, a parachute release apparatus is generally referenced as 10.

Figure 1:
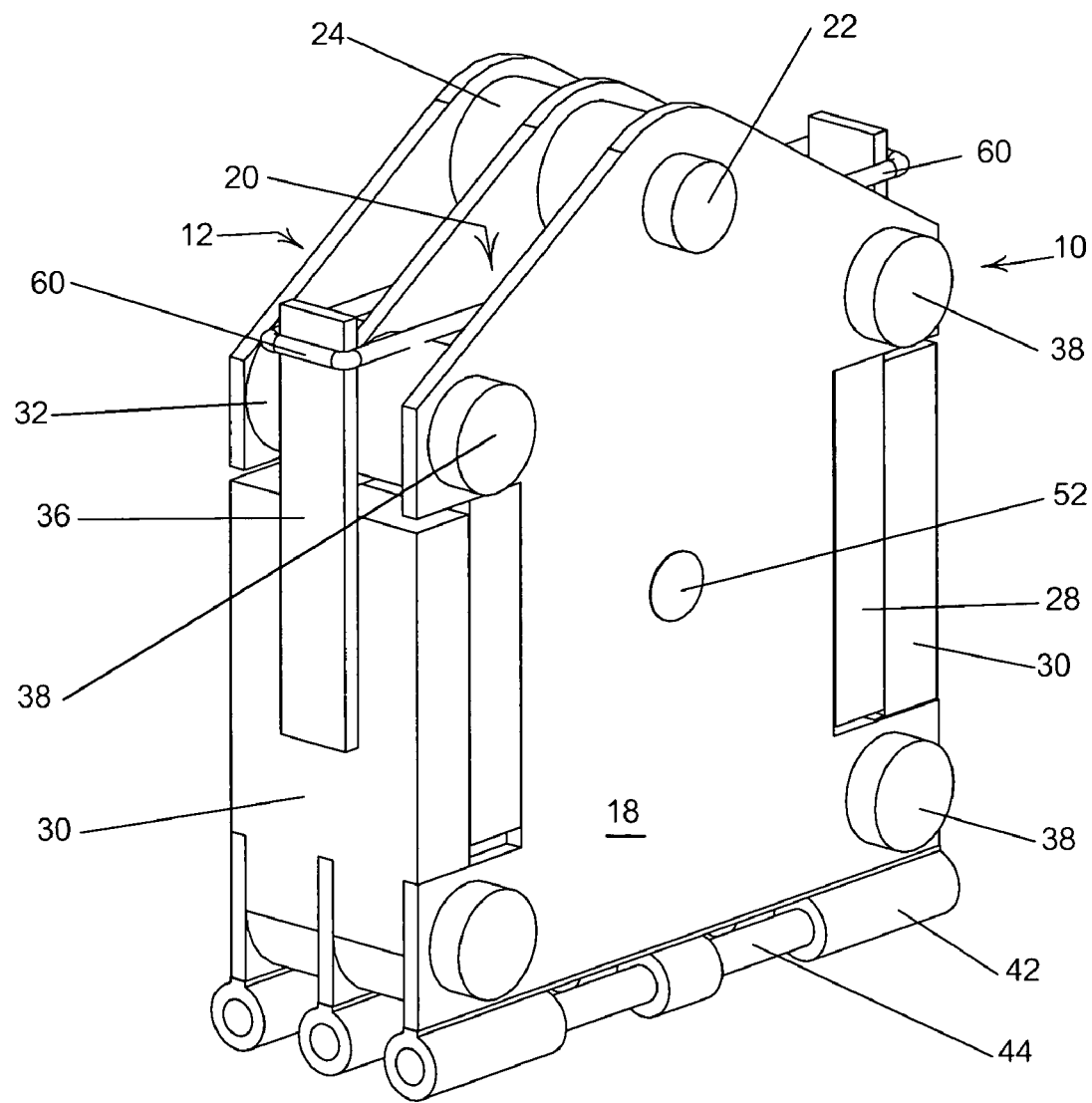
FIG. 1 is an isometric view of the parachute release apparatus.
Figure 2:
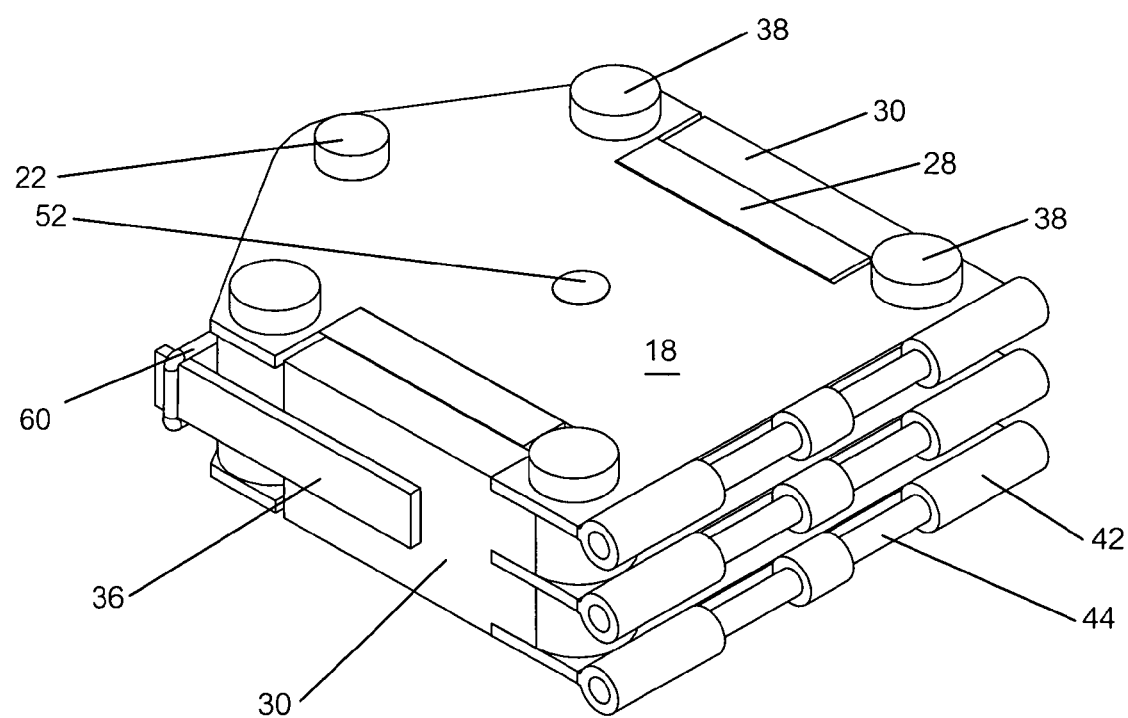
FIG. 2 is another isometric view of the parachute release apparatus.

As illustrated in FIGS. 1 and 2, a parachute release apparatus 10 is comprised of a pendant body 12, which typically is comprised of a plurality of flat pendant body plates 18 disposed with their faces in parallel, thus defining one or more cavity spaces 20 between the pendant body plates 18. The pendant body plates 18 are held in place by a plurality of pins installed transversely between the pendant body plates 18. An upper clevis pin 22 is installed near the top of the pendant body 12. The upper clevis pin 22 may be held in place by providing such a pin which is threaded at its distal end and engaging with threads tapped in one of the end pendent body plates 18. Tubular spacers 24 are provided in the cavity spaces 20 between the holes in the pendant body plates 18, through which the upper clevis pin 22 passes, to maintain a specified depth in each cavity 20.

Figure 3:
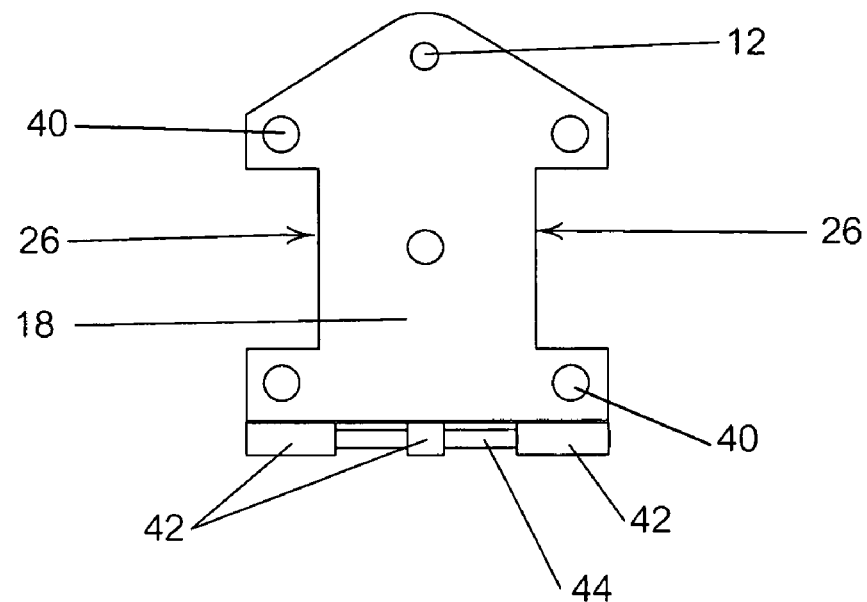
FIG. 3 is a front elevational view of a pendant body plate of the parachute release apparatus.

As shown in FIG. 3, either side edge of each pendant body plate 18 defines a rectangular indent 26. The bottom edges of the pendant body plates 18, or at least the two outer ones in the preferred embodiment of a three-plate pendant body 12, have disposed thereon a series of tubular barrel sections 42, each barrel section 42 defining a circular shaft through which registers a fixed strap pin 44. The strap pin 44 is used to connect one end of a suspension strap 46 to the pendant body 12, as described below.

Figure 4:
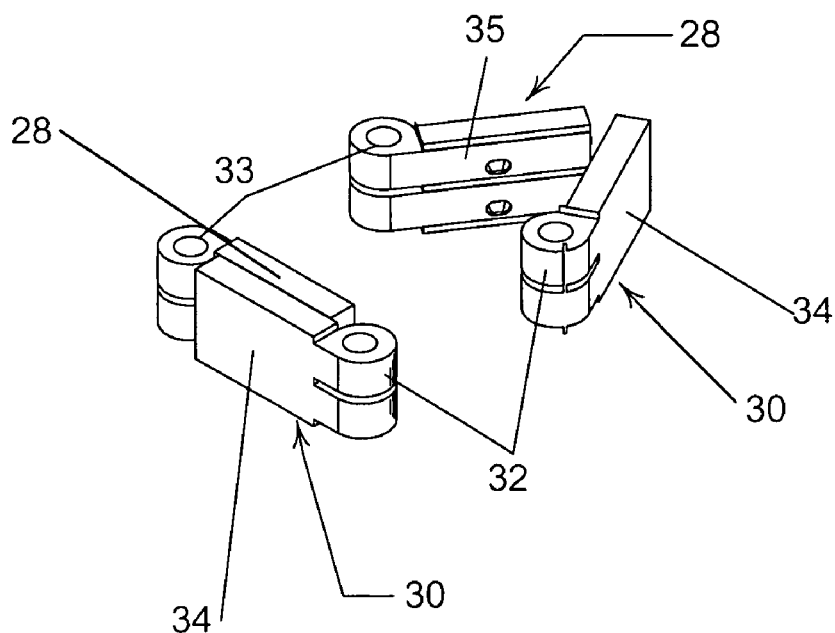
FIG. 4 is an isometric view of the inner and outer latch plates.

Returning to FIGS. 1 and 2, disposed on either side of the pendant body 12 are an inner latch plate 28 and an outer latch plate 30. As shown with more particularity in FIG. 4, each latch plate 28, 30 is analogous to half of a common butt hinge, and has one or more barrel sections 32, equal to the number of cavities 20 defined in the pendant body 12. The barrel sections 32 are located along the bottom edge of the outer plates 30, and along the top edge of the inner plates 28. Each barrel section 32 is tubular, defining a horizontal shaft running coaxially through the length of the barrel sections 32. Each outer and inner latch plate 28, 30 also has a leaf section 34, 35, coupled to the barrel section 32 of each latch plate 34, 35. The leaf sections are dimensioned to register with the indent 26 in the pendant body plates 18.

The inner and outer latch plates 28, 30 articulate with the pendant body 12 by means of hinge pins 38 disposed through the hinge pin holes 40 above and below the indents 26, (as shown in FIGS. 1 and 2) transversely across the plates comprising the pendant body 12, and engaging the shafts of the barrel sections 32 in the respective latch plates 28, 30. The thickness of the barrel sections 32 of the inner and outer latch plates 28, 30 are specified to correspond to the desired depth of the cavity space 20 between the pendant body plates 18. The gap defined between the several barrel sections 32 on each latch plate 28, 30 is sized to permit a firm articulation of the barrel sections 32 around the hinge pins 38.

Returning to FIGS. 1 and 2, an extension arm 36 is disposed on the outer surfaces of each outer leaf section 34. The two extension arms 36 extend vertically upward beyond the barrel sections 32 on the top section of the two inner latch plates 28.

Like the upper clevis pin 22, the four hinge pins 38 may be secured to the pendant body 12 by providing threads on the end sections of the pins which engage with threads tapped in the holes above and below the indents 26 of one of the end pendent body plates 12. Alternatively, the threaded ends may extend beyond an unthreaded hole in the end pendant body plate 18, and a nut and lock-washer disposed on the threaded end section of the hinge pin 38.

Figure 5:
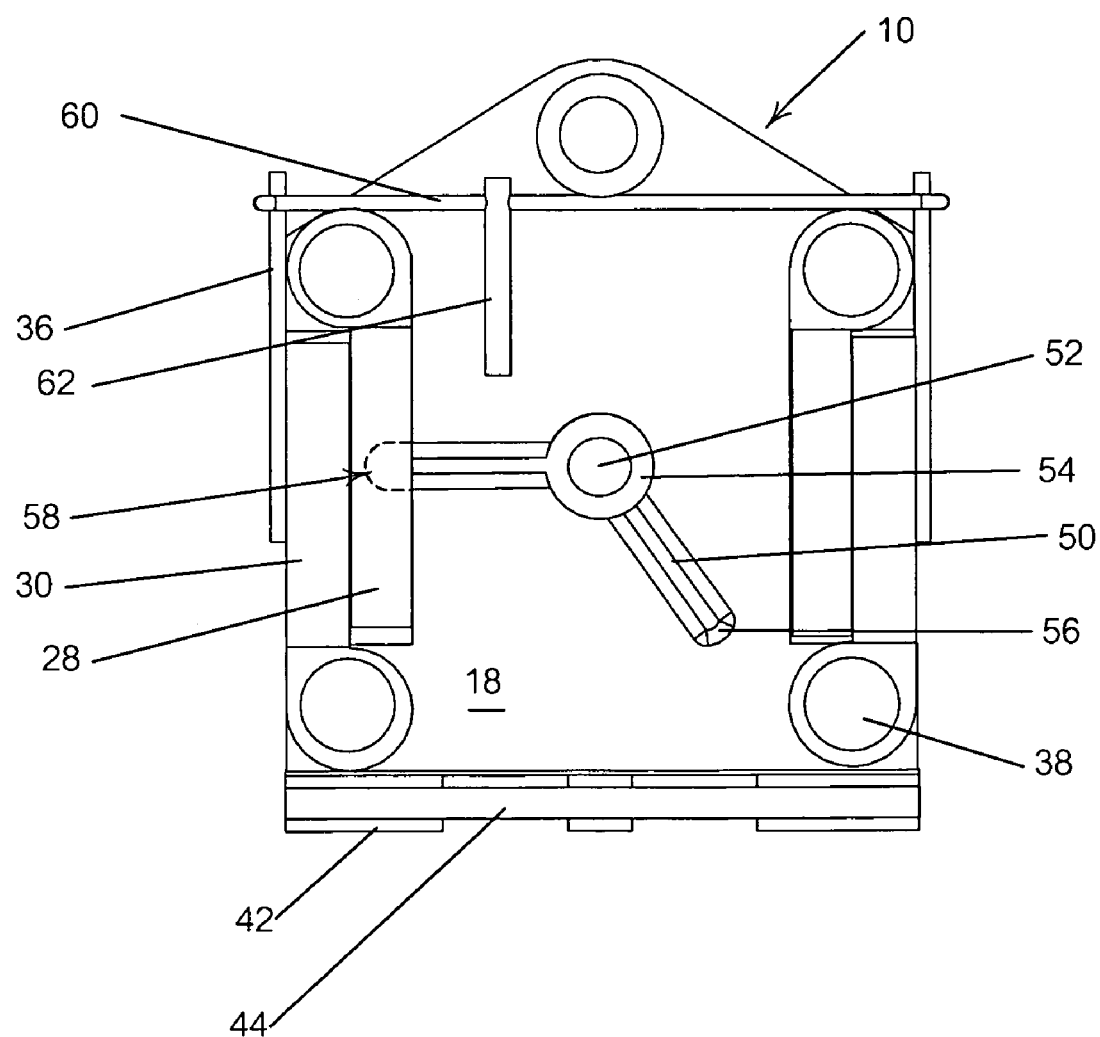
FIG. 5 is a front elevational sectional view of the parachute release apparatus.
Figure 6:
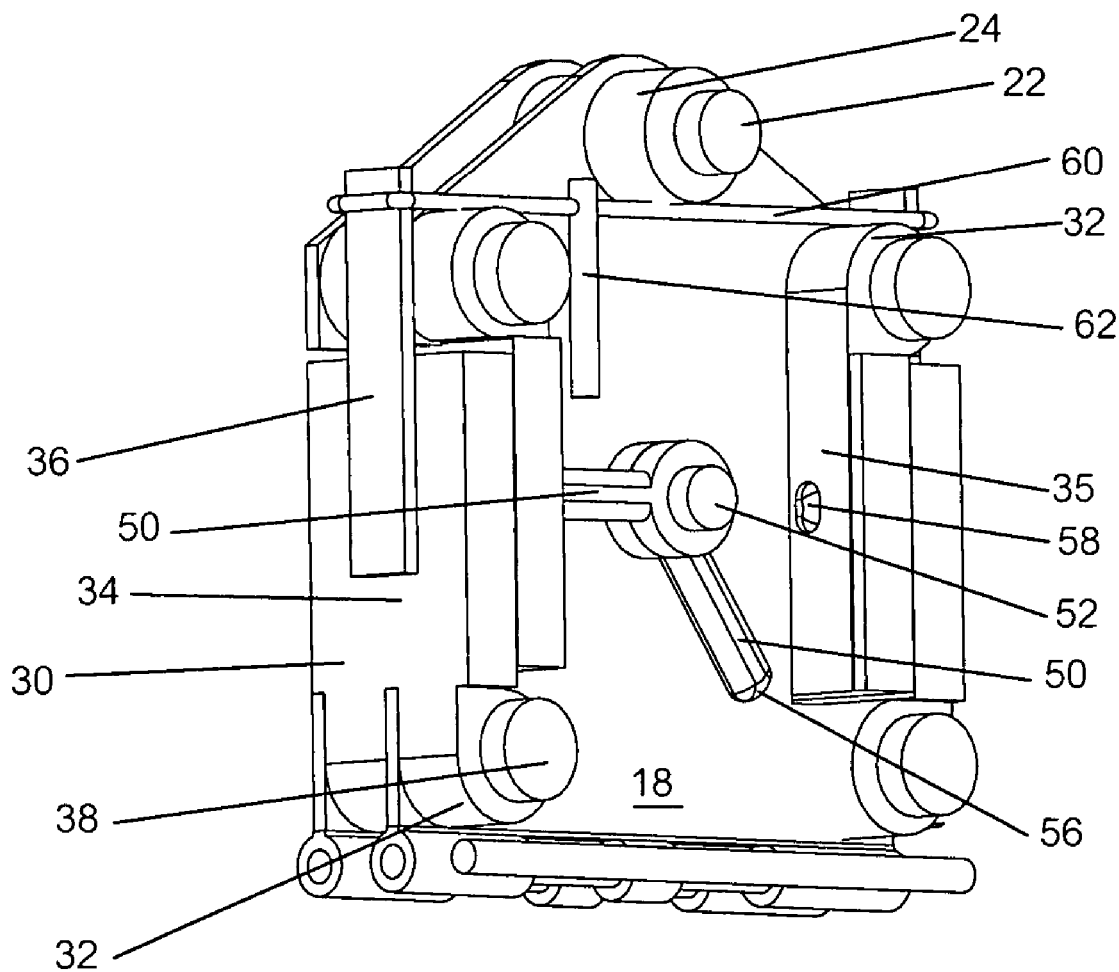
FIG. 6 is an isometric sectional view of the parachute release apparatus.

In FIGS. 5 and 6, the parachute release mechanism 10 is shown with one end pendant body plate 18 removed, thereby exposing a cavity 20 of the pendant body 12. As shown, a release arm 50 mechanism is assembled within each cavity 20 between the pendant body plates 18 of the pendant body 12. The sides of each cavity 20 are bounded by inner and outer latch plate leaf sections 34, 35. The interior surface of the inner latch plate leaf sections 35 defines a concave socket 58. A release pivot pin 52 is disposed transversely through the plates 18, at or near a point medial between the indents 26 in the sides of the pendant body plates 18. Within each cavity 20, a pair of release arms 50 articulate on the release pivot pin 52. Each release arm 50 has a busing end section 54 with an articulating bushing adapted to register on the release pivot pin 52, with the two release arms 50 registering in tandem on the release pivot pin 52. Each release arm 50 is elongated and preferably cylindrical in cross-section. Each release arm 50 has a free end section 56. The sockets 58 in the surface of the inner latch plate 28 and the length of the release arms 50 are adapted so that, when the inner and outer latch plate leaf sections 34, 35 are in the latched configuration, the release arm free end sections 56 each register with one of the sockets 58 of one of the inner latch plates 28. In FIGS. 5 and 6, the free end section 56 of left release arm 50 is shown engaged with the socket 58 of the left inner latch plate 28, while the right release arm 50 is shown unengaged.

Figure 7:
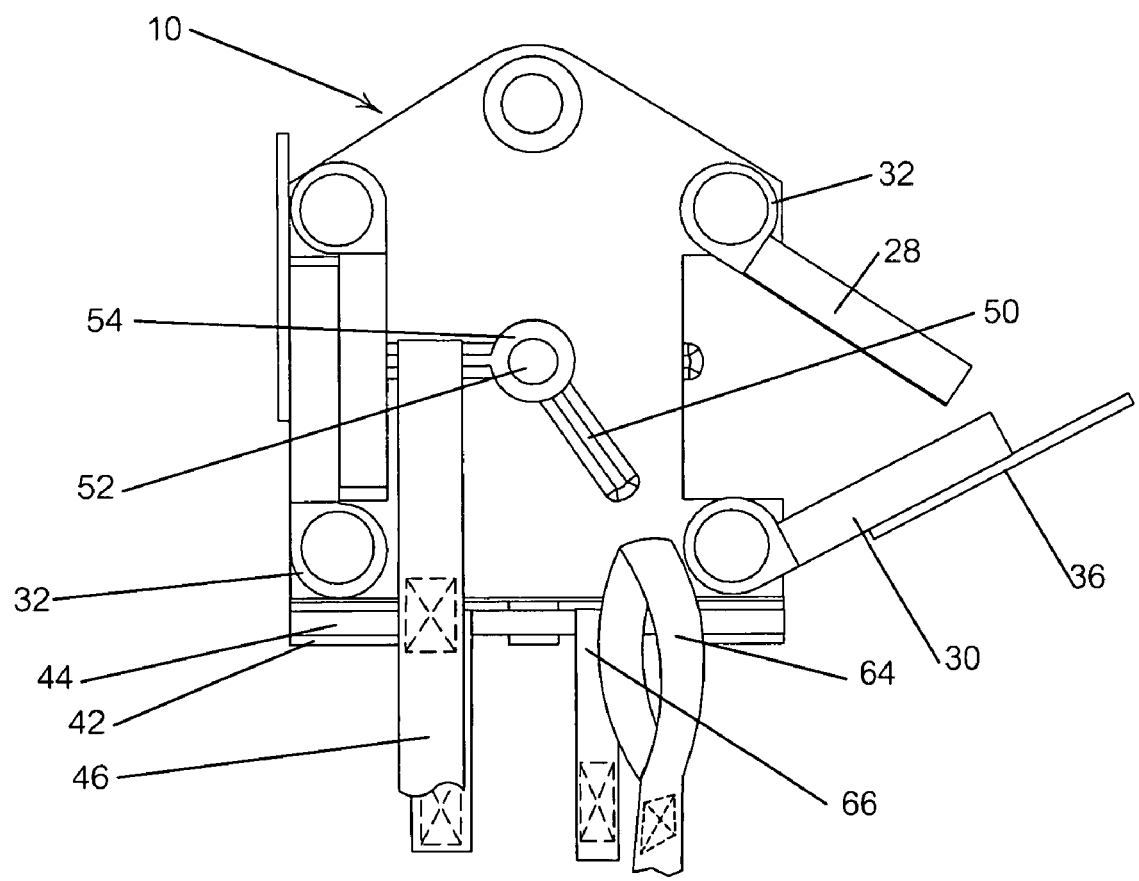
FIG. 7 is a front elevational sectional view of the parachute apparatus, illustrating assembly of the suspension straps.

The parachute release apparatus 10 is coupled with a cargo platform 12 by two or more pair of suspension straps 46. In FIG. 7, the means for assembling and releasing the suspension straps 46 with the release arms 50 is illustrated. In FIG. 7, the left half of the parachute release apparatus 10 illustrates the suspension straps 46 engaged with the parachute release apparatus 10, while the right half of the figure shows the suspension strap 46 released from the parachute release apparatus 10. To engage the releasable end section 64 of one of the suspension straps 46 with the parachute release apparatus 10, the loop on the releasable end section 64 is slipped over the release arm 50. The release arm 50 is then articulated upward to a horizontal attitude, meaning an attitude parallel to the bottom edge of the pendant body plates 18. The inner latch plate 28 is first articulated downward, to have the socket 58 in the leaf section 35 of the inner latch plate 28 engage with the free end section 56 of the release arm 50. The outer latch plate 30 is then articulated upwards. When this process is repeated on both sides, the two extension arms 36 are then aligned parallel and upward. A cut loop 60 with a pyrotechnic cord cutter 62 disposed thereon is then slipped over the two extension arms 36.

In the preferred embodiment of the invention, a fixed end section 66 of each suspension strap 46 is coupled to the pendant body 12 by the strap pin 44 passing through the eye of the loop in the fixed end section 66. The other, releasable end 64 of the suspension strap 46 similarly has a loop which is adapted to slide over one of the release arms 50.

The parachute release apparatus 10 is coupled with the cargo platform 72 using a set of the suspension straps. Typically four suspension straps 46 are used, one for supporting each corner of a rectilinear cargo platform 72. As shown in FIG. 2, the preferred means of attaching these slings is to use a parachute release apparatus 10 with two cavities 20. This has four available release arms 50, two in each cavity 20.

Figure 8:
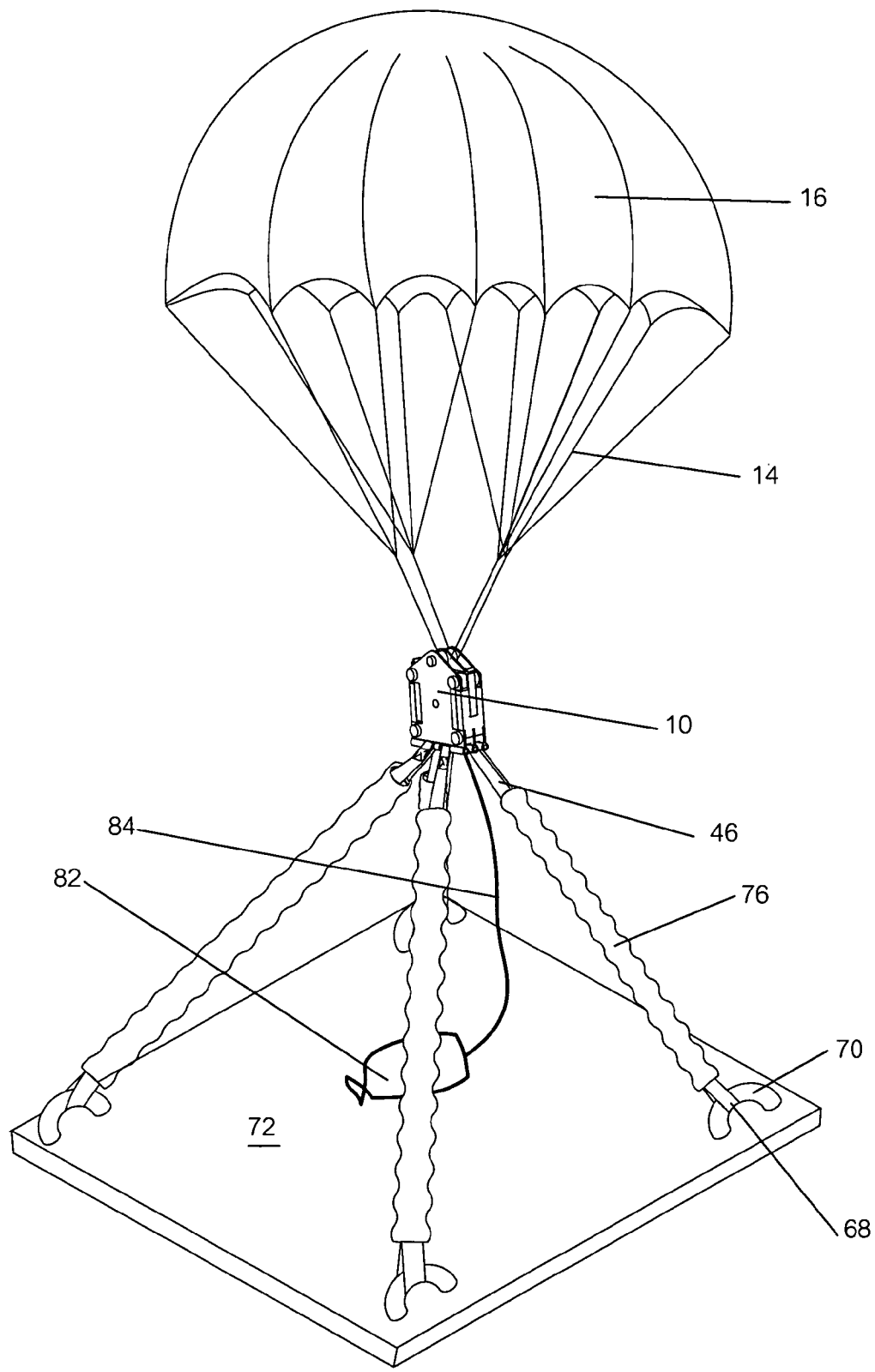
FIG. 8 is an isometric view of the parachute release apparatus assembled with an aerial cargo delivery platform.

Referring to FIG. 8 as well as FIGS. 6 and 7, a cargo can be delivered aerially by connecting a drogue parachute 16 to the parachute release apparatus 10 by the drogue parachute's suspension lines 14, which are coupled to the upper clevis pin 22. The parachute release apparatus 10 is coupled to the cargo platform 72 by two or more pair of suspension straps 46. Each suspension strap 46 is coupled to both the parachute release apparatus 10 and the cargo platform 72 by first attaching the fixed end section 66 to the pendant body 12 by engaging one of the two strap pins 44 with a loop at the fixed end section 66 as was described above. The suspension strap 46 is then routed to a clevis 70 or shackle at one corner of the cargo platform 72. The strap is then routed through the opening defined by the perimeter of the clevis 70 or shackle, and then back towards the pendant body 12. The other, releasable end section 64 of the suspension strap 46, is then registered with one of the release arms 50. The other suspension straps 46 are installed on the strap pin 44 and release arm 50 in like manner. Then, with the four release arms 50 aligned horizontally across the pendant body 12, the inner and outer latch plates 28, 30 are articulated to engage and latch the release arms 50, and the cut loop 60 and pyrotechnic cord cutter 62 are installed, as was previously described.

The end section of each release arm 50 and the socket 58 defined in the inner latch plate leaf sections 34 have complementary cross-sections. Preferably, this cross-section is arcuate and, more preferably, semi-circular or conical. When the parachute release apparatus 10 is assembled and deployed, the weight from the suspension straps 46 is distributed into the release pin 50 in a direction tangent to the interior surface of the inner latch plate 28. For the parachute release apparatus 10 to properly release the suspension strap 46, a force directed outward on each inner latch plate 28 must be provided to release the release arm 50 free end section 56 from the socket 58. This force may be provided in either or both of two means.

The first means is by fabricating the inner latch plate 28 such that the center of the shafts in the barrel sections 32 are offset from the centerline of the thickness of the inner leaf section 35 of the latch plate 28. This places the center of gravity of the overall inner latch plate 28 horizontally offset from the vertical centerline of the barrel section 32 shaft, which applies a slight torque on the barrel section 32. This slight torque is usually sufficient to force outward the two latch plates 28, 30 and release the free end section 56 from the socket 58.

The other means is to slightly taper the sides of the end section of the release arm 50 and the wall of the socket 58. By tapering, the force of the release arm 50, which is impressed to the socket 58 normal to the surfaces of the free end 56 and the wall of the socket 58, will have both vertical and horizontal components. The horizontal or outward force component provides additional force beyond that of the natural torque on the inner latch plate 28 from the displacement of its center of gravity. Depending on the materials of construction selected, this additional outward force may be necessary to overcome friction between the release arm end section 56 and the socket 58.

Figure 9:
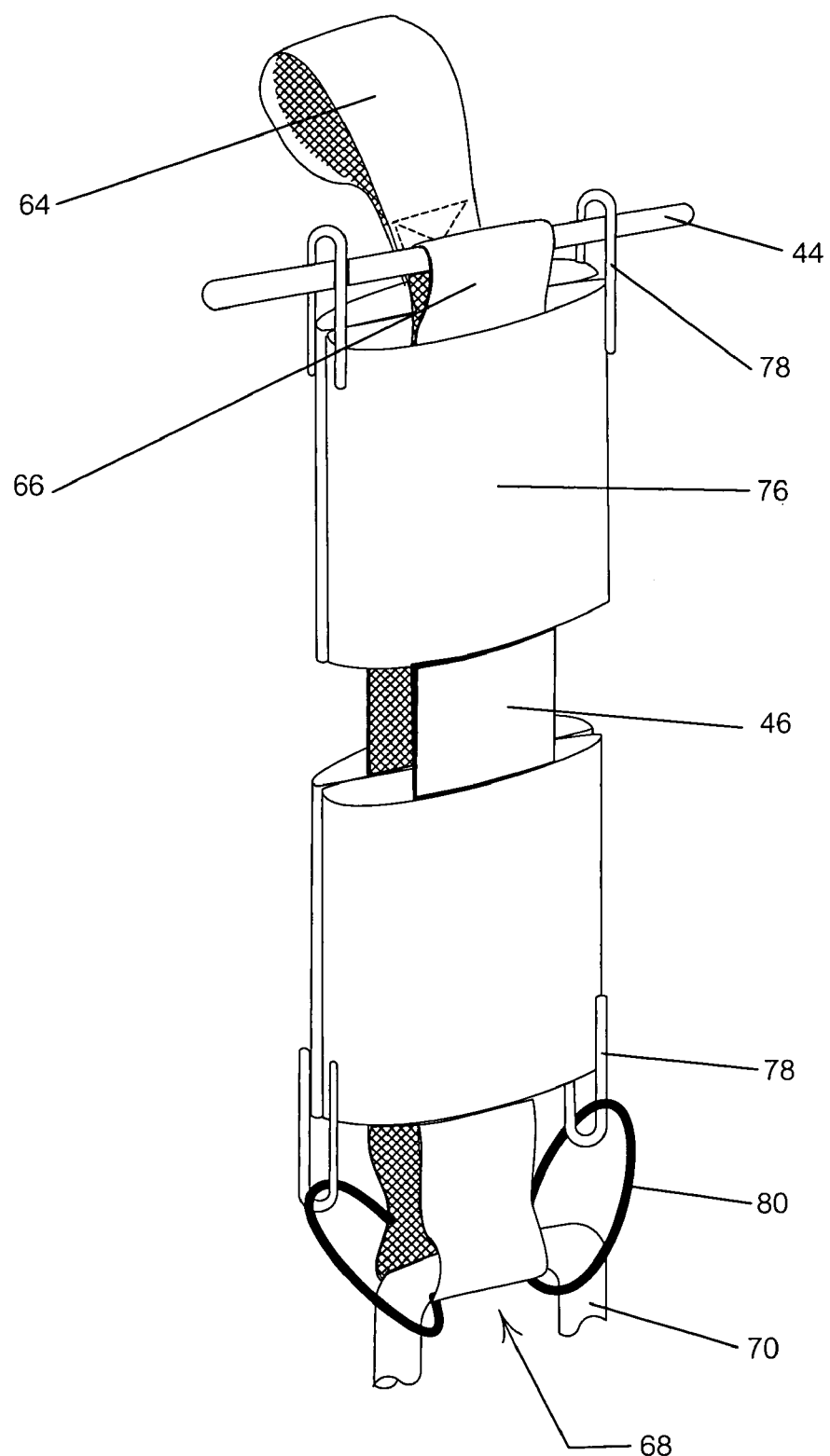
FIG. 9 is an isometric view of the suspension straps assembled with the bifurcated sleeve.

In coupling the suspension straps 46 with the parachute release apparatus 10 and the cargo platform 72, the lengths of the suspension straps 46 are preferably routed through a bifurcated sleeve 76. As shown in FIG. 9, a bifurcated sleeve 76 has two parallel tubular conduits conjoined longitudinally. The bifurcated sleeve 76 has a pair of attachment links 78 at both the top end, proximate to the parachute release apparatus 10, and at the bottom end, proximate to the cargo platform 72. The pair of attachment links 78 at the upper end of the bifurcated sleeve 76 are attached to the strap pin 44 adjacent to the fixed end section 66 of the suspension strap 46. The pair of attachment links 78 at the bottom end of the bifurcated sleeve 76 are attached to the clevis 70 on the cargo platform 70 by a frangible link 80. The two sections of the suspension strap 46 on either side of the bight 68 around the clevis 70 are routed through either of the two conduit sleeves of the bifurcated sleeve 76.

The bifurcated sleeve 76 is manufactured of a flexible fabric or material, such as canvas, which would adapt the bifurcated sleeve 76 to collapse longitudinally. This property maintains containment of the suspension strap 46, when assembled in the preferred embodiment, after release from the release arm 50, but prior to disengagement from the clevis 70 of the cargo platform 72. When the suspension strap 46 is installed in the manner described above, the distance between the parachute release apparatus 10 and each clevis 70 of the cargo platform 72 is about one-half the total length of the suspension strap 46. Once the releasable end 64 of the suspension strap 46 is liberated from the release arm 50, the section of the suspension strap 46 between the bight 68 and the releasable end 64 is drawn through the clevis 70, extending the length between the bight 68 and the fixed end 66, as well as the distance between the parachute release apparatus 10 and the clevis 70 of the cargo platform 72. Once the releasable end 66 of the suspension strap 64 has been drawn through the clevis 70, the suspension strap 46 has been drawn to its full length. Accordingly, the length of the uncollapsed bifurcated sleeve 76 is near equal to the length of the suspension strap 46, but which is adaptable to collapse to about one-half of its normal extended length.

In operation, once a cargo platform 72 has been released from a delivery aircraft and has been slowed in descent by a drogue parachute 16, the pyrotechnic cord cutter 62 severs the cut loop 60. The pyrotechnic cord cutter 62 is activated by a timer or by a remotely transmitted signal. Once the cut loop 60 is severed, the extension arms 36 are released, and the latch plates 28, 30 are free to articulate. The outer latch plates 30 simultaneously articulate outward and downward, and the inner latch plates 28 articulate outward and upward. As the inner latch plates 28 pivot, the free end sections 56 of the release arms 50 disengage from the sockets 58 in the inner surface of the inner leaf sections 35. The release arms 50 rotate downward due to the gravitational strain from the releasable end section 64 of the suspension straps 46. Once released, the suspension straps 46 begin sliding through the interior section of each tubular conduit of the bifurcated sleeve 76, as the bifurcated sleeve 76 begins to extend from its partially collapsed state. Once the releasable end 64 of the suspension strap 46 has been pulled through the clevis 70 of the cargo platform 72, the bifurcated sleeve 76 has extended its full length. At this point, the length of the suspension straps 46 is contained within one tubular conduit section of the bifurcated sleeve 76. With the suspension straps 46 disengaged from the devises 70 of the cargo platform 72, the cargo platform 72 is momentarily suspended solely from the bifurcated sleeves 76 by their attachment loops 78 and frangible links 80. This sudden strain on the bifurcated sleeve 76 parts the frangible links 80. The cargo platform 72 is then released and independent from the parachute release apparatus 10, except for a deployment line 84 connected from the parachute release apparatus 10 to the container of the main parachute 82 stored on the cargo platform 72. Once the suspension straps 46 are released from the cargo platform 72, this deployment line 84 is drawn taught and pulls up on the main parachute 82 container, deploying the main parachute 82. The cargo platform 72 then makes its final descent under the support of the main parachute 82.

While various embodiments of the invention have been described above, it should be understood that they have been presented by way of example, and not limitation. It will be apparent to persons skilled in the relevant art that various changes in form and detail may be made therein without departing from the spirit, and scope and application of the invention. This is especially true in light of technology and terms within the relevant art that may be later developed. Thus, the present invention should not be limited by any of the above-described exemplary embodiments, but should only be defined in accordance with the appended claims and their equivalents.

I claim:

1. A parachute release apparatus, comprising:
   a) a pendant body;
   b) a pair of latch mechanisms, one each of which is disposed on either side of the pendant body;
   c) a plurality of release arms each having a free end section and an articulating end section, wherein the articulating end section is rotationally engaged with the pendant body and the free end section is capable of coupling with one of the latch mechanisms;
   d) a latch securing link, releasably maintaining simultaneously the two latch mechanisms in a latched configuration; and,
   e) a release means for releasing the latch securing link from the two latch mechanisms simultaneously at a predetermined time.

2. The parachute release apparatus of claim 1, wherein the pendant body is comprised of three or more substantially parallel plates, wherein two or more cavities are defined between the parallel plates.

3. The parachute release apparatus of claim 2, further comprising spacers for maintaining consistent spacing between the parallel plates.

4. The parachute release apparatus of claim 2, wherein a pair of release arms are disposed within each cavity.

5. The parachute release apparatus of claim 2, wherein the number of release arms is four.

6. The parachute release apparatus of claim 1, wherein each of the latch mechanisms is comprised of an inner and an outer articulating latch plate.

7. The parachute release apparatus of claim 6, further comprising an extension member disposed on each outer latch plate, wherein the latch securing link is a cut loop engaging with each extension member.

8. The parachute release apparatus of claim 6, wherein the inner and outer latch plates of each latch mechanism each articulate at an opposite end of the other.

9. The parachute release apparatus of claim 6, wherein the inner latch plate of each latch mechanism has a face within which is defined a plurality of sockets, each socket adapted to receive the free end section of one of the release arms.

10. The parachute release apparatus of claim 1, further comprising a plurality of suspension straps, each having a releasable end section, a fixed end section, and a bight disposed between the releasably and fixed end section, wherein the releasable end section is capable of releasable engagement with one of the articulating release arms and the bight is capable of engagement with a cargo platform.

11. The parachute release mechanism of claim 10, wherein the fixed end section of each suspension strap is coupled with a suspended cargo platform.

12. The parachute release apparatus of claim 11, further comprising a plurality of pairs of sleeves, wherein each sleeve defines an internal tubular conduit and is coupled at an upper end with the pendant body and capable of releasably coupling at a lower end with the cargo platform wherein each suspension strap traverses consecutively through the internal tubular conduit of each sleeve of a pair.

13. The parachute release apparatus of claim 12, wherein each sleeve is longitudinally collapsible to at least one-half its extended length.

14. The parachute release apparatus of claim 10, further comprising a plurality of bifurcated sleeves, each bifurcated sleeve having a pair of longitudinal, parallel tubular conduits wherein each bifurcated sleeve is coupled at an upper end with the pendant body and capable of releasable coupling at a lower end with a cargo platform, and each suspension strap traverses consecutively through the two parallel tubular conduits.

* * * * *